(12) United States Patent
Arkwright et al.

(10) Patent No.: US 11,994,131 B2
(45) Date of Patent: May 28, 2024

(54) PORTABLE PUMP

(71) Applicant: Reed Manufacturing Co., Erie, PA (US)

(72) Inventors: Christopher Arkwright, Erie, PA (US); Isaac Scott Howard, East Springfied, PA (US); Nicholas Anthony Eades, North East, PA (US)

(73) Assignee: Reed Manufacturing Company, Erie, PA (US)

( * ) Notice: Subject to any disclaimer, the term of this patent is extended or adjusted under 35 U.S.C. 154(b) by 725 days.

(21) Appl. No.: 16/599,425

(22) Filed: Oct. 11, 2019

(65) Prior Publication Data

US 2021/0108641 A1    Apr. 15, 2021

(51) Int. Cl.
*F04D 13/06*    (2006.01)
*F04D 3/00*    (2006.01)
(Continued)

(52) U.S. Cl.
CPC ........... *F04D 13/068* (2013.01); *F04D 3/005* (2013.01); *F04D 13/0613* (2013.01);
(Continued)

(58) Field of Classification Search
CPC ...... F04D 13/086; F04D 13/068; F04D 13/08; F04D 29/708; F04D 29/426;
(Continued)

(56) References Cited

U.S. PATENT DOCUMENTS 2,378,121 A * 6/1945 Baker .................. F21V 17/164
                                                    362/433
2,623,469 A * 12/1952 Gray ......................... F04C 2/16
                                                    222/385
(Continued)

FOREIGN PATENT DOCUMENTS

| DE | 202 07 187 U 1 | 11/2002 | ............. F04D 13/00 |
| JP | 2001-032788 | 2/2001 | ............. F04D 13/00 |
| KR | 20-1990-0003838 | 5/1990 | ............. F04D 15/00 |

OTHER PUBLICATIONS

Oberg, E. Jones, F.D. Horton, H.L. Ryffell, H.H.. (2000). Machinery's Handbook (26th Edition). Industrial Press. Retrieved from https://app.knovel.com/hotlink/toc/id:kpMHE00002/machinerys-handbook-26th/machinerys-handbook-26th (Year: 2000).*

(Continued)

*Primary Examiner* — Peter J Bertheaud
(74) *Attorney, Agent, or Firm* — Bauer & Joseph; Robert M. Bauer (57) ABSTRACT

A pump for non-flammable liquids has an improved mounting for the motor which facilitates the relatively quick and easy removal of the motor from the pump. The pump has a main body which is hollow and cylindrical. A motor housing is connected to the main body by threads at a first end and has a removable end cap on its second end. The electric motor is located in said motor housing and secured when the end cap is on the motor housing. An electronics housing has a battery adapter plate, a switch, and a discharge port, and encloses wires and electronics such that the motor pumps the (Continued)

liquid from the end cap, through the motor housing and the main body, and out of the discharge port when the switch is turned on.

10 Claims, 13 Drawing Sheets

(51) Int. Cl.
    *F04D 13/08*              (2006.01)
    *F04D 29/40*              (2006.01)
    *F04D 29/42*              (2006.01)
    *F04D 29/58*              (2006.01)
    *F04D 29/60*              (2006.01)
    *F04D 29/70*              (2006.01)
    *H02K 5/132*             (2006.01)

(52) U.S. Cl.
    CPC ......... *F04D 13/0693* (2013.01); *F04D 13/08* (2013.01); *F04D 13/086* (2013.01); *F04D 29/406* (2013.01); *F04D 29/426* (2013.01); *F04D 29/4293* (2013.01); *F04D 29/5806* (2013.01); *F04D 29/605* (2013.01); *F04D 29/708* (2013.01); *F04D 29/60* (2013.01); *H02K 5/132* (2013.01)

(58) Field of Classification Search
    CPC .. F04D 29/605; F04D 29/4293; F04D 29/406; F04D 29/5806; F04D 3/005; F04D 13/0613; F04D 13/0693; F04D 29/60; H02K 5/132
    See application file for complete search history.

(56) References Cited

U.S. PATENT DOCUMENTS

| | | | | |
|---|---|---|---|---|
| 3,088,415 A * | 5/1963 | Culleton | ............... | F04D 13/086 |
| | | | | 415/113 |
| 3,144,832 A * | 8/1964 | Haynes | ............... | F04D 9/02 |
| | | | | 415/121.2 |
| 3,272,136 A * | 9/1966 | Franzen | ............... | F04D 15/0077 |
| | | | | 310/52 |
| 3,398,687 A * | 8/1968 | Yoshikawa | ............... | F04D 13/068 |
| | | | | 417/366 |
| 3,556,677 A * | 1/1971 | Tremain | ............... | H02K 17/30 |
| | | | | 200/83 Y |
| 3,748,066 A * | 7/1973 | Sully | ............... | F04D 13/086 |
| | | | | 415/121.2 |
| 3,904,393 A * | 9/1975 | Morse | ............... | B01F 25/21 |
| | | | | 55/505 |
| 3,945,771 A * | 3/1976 | Arakawa | ............... | F04D 13/086 |
| | | | | 417/423.3 |
| 4,101,950 A * | 7/1978 | Hager | ............... | H02K 33/02 |
| | | | | 417/417 |
| 4,123,201 A * | 10/1978 | Andriulis | ............... | F04C 27/02 |
| | | | | 464/147 |
| 4,218,195 A * | 8/1980 | Shure | ............... | F04D 13/068 |
| | | | | 417/423.3 |
| 4,230,440 A * | 10/1980 | Niedermeyer | ............... | F04D 13/10 |
| | | | | 417/423.15 |
| D258,590 S | 3/1981 | Shaw | ............... | D15/7 |
| 4,502,515 A * | 3/1985 | Kobayashi | ............... | F04B 49/025 |
| | | | | 141/195 |
| 4,540,342 A * | 9/1985 | Steiner | ............... | F04D 15/0218 |
| | | | | 417/40 |
| D280,823 S * | 10/1985 | Maruyama | ............... | D15/7 |
| D280,902 S | 10/1985 | Maruyama | ............... | D15/7 |
| D280,992 S | 10/1985 | Maruyama | ............... | D15/7 |
| 4,552,515 A | 11/1985 | Endo | ............... | 417/472 |
| D283,225 S | 4/1986 | Canvasser | ............... | D15/7 |
| D295,522 S * | 5/1988 | Martin | ............... | D15/7 |
| D296,103 S * | 6/1988 | Harvey | ............... | D15/7 |
| D299,720 S * | 2/1989 | Yoo | ............... | D15/7 |
| 4,966,534 A * | 10/1990 | Hasslen, III | ............... | F04D 13/10 |
| | | | | 417/424.2 |
| 5,094,591 A * | 3/1992 | Whitley, II | ............... | F04D 29/426 |
| | | | | 417/423.1 |
| 5,205,725 A * | 4/1993 | Pattison | ............... | F04D 13/086 |
| | | | | 415/206 |
| 5,249,930 A * | 10/1993 | Pacquesi | ............... | F04D 13/086 |
| | | | | 417/313 |
| 5,360,322 A * | 11/1994 | Henein | ............... | H02K 7/083 |
| | | | | 417/313 |
| 5,378,121 A * | 1/1995 | Hackett | ............... | F04D 29/061 |
| | | | | 417/423.12 |
| 5,860,792 A * | 1/1999 | Marks | ............... | F04B 23/023 |
| | | | | 417/423.9 |
| 5,961,293 A * | 10/1999 | Clemmons | ............... | F02M 37/10 |
| | | | | 417/423.3 |
| 6,179,558 B1 * | 1/2001 | Eastman, III | ............... | F04D 13/068 |
| | | | | 415/121.2 |
| 6,390,780 B1 | 5/2002 | Batchelder | ............... | 417/36 |
| 6,447,261 B1 | 9/2002 | McCook | ............... | 417/234 |
| 6,491,494 B1 * | 12/2002 | Beckenbach | ............... | F01P 5/12 |
| | | | | 415/206 |
| 6,715,994 B2 * | 4/2004 | Patel | ............... | F04D 29/708 |
| | | | | 417/12 |
| 7,121,433 B2 * | 10/2006 | Nelson | ............... | F04D 13/024 |
| | | | | 417/420 |
| 7,264,449 B1 * | 9/2007 | Harned | ............... | F04D 15/0218 |
| | | | | 417/366 |
| 7,748,965 B2 * | 7/2010 | Schopperle | ............... | F04D 29/605 |
| | | | | 417/361 |
| 7,806,664 B2 * | 10/2010 | Patel | ............... | F04B 39/121 |
| | | | | 417/40 |
| 7,866,512 B2 * | 1/2011 | Fertig | ............... | B65D 77/0466 |
| | | | | 222/383.2 |
| 8,297,952 B2 * | 10/2012 | Wu | ............... | F04D 13/10 |
| | | | | 137/550 |
| 8,393,877 B2 * | 3/2013 | Metcalfe | ............... | F04D 29/28 |
| | | | | 417/364 |
| D691,641 S * | 10/2013 | Landry | ............... | D15/7 |
| 9,261,096 B2 * | 2/2016 | Lin | ............... | F04D 1/06 |
| 9,660,497 B2 * | 5/2017 | Ladd | ............... | H02K 5/132 |
| D800,176 S * | 10/2017 | Soto | ............... | D15/7 |
| 10,302,090 B2 * | 5/2019 | Moormann | ............... | F04D 29/4293 |
| D863,363 S | 10/2019 | Exley | ............... | D15/7 |
| 10,473,096 B2 * | 11/2019 | Calhoun | ............... | F04B 49/06 |
| 11,136,983 B2 * | 10/2021 | Mayleben | ............... | F04D 29/2205 |
| 2005/0135945 A1 * | 6/2005 | Nelson | ............... | F04D 13/068 |
| | | | | 417/234 |
| 2005/0244287 A1 * | 11/2005 | Dobrynski | ............... | F04B 17/03 |
| | | | | 417/423.3 |
| 2006/0000789 A1 * | 1/2006 | Pleiman | ............... | B25H 3/04 |
| | | | | 211/70.6 |
| 2006/0039800 A1 * | 2/2006 | Saunders | ............... | B63B 13/00 |
| | | | | 417/234 |
| 2007/0025866 A1 | 2/2007 | Douyama et al. | ......... | 417/423.3 |
| 2009/0058209 A1 * | 3/2009 | Baranowski | ............... | F04D 29/668 |
| | | | | 310/91 |
| 2010/0111698 A1 * | 5/2010 | Wiedeman | ............... | F04D 29/40 |
| | | | | 416/189 |
| 2014/0147252 A1 * | 5/2014 | Takano | ............... | F04D 29/444 |
| | | | | 416/54 |
| 2014/0157512 A1 * | 6/2014 | Yanity | ............... | A61H 33/0087 |
| | | | | 4/541.3 |
| 2016/0094105 A1 * | 3/2016 | Ladd | ............... | F04B 17/03 |
| | | | | 310/71 |
| 2018/0372122 A1 | 12/2018 | Wang | | |
| 2019/0154039 A1 * | 5/2019 | Wang | ............... | F04D 29/007 |
| 2020/0386354 A1 * | 12/2020 | Zoe | ............... | F16L 37/004 |

(56) References Cited

OTHER PUBLICATIONS

Search Report, Germany Patent & Trademark Office, Utility Model Application No. 202020105808.8, dated Jul. 21, 2021 (5 pages).

* cited by examiner

PORTABLE PUMP

FIELD OF THE INVENTION

The present invention relates to portable pumps. More particularly, the invention relates to the configuration of a portable pump with an electric motor for pumping a non-flammable liquid.

BACKGROUND

It is known to have a portable water pump that can be easily moved and used to pump water from a variety of locations. See, for example, U.S. Pat. Nos. 4,522,515 and D800,176. However, there are a number of disadvantages with conventional pumps.

While such pumps work well with clean water and in good conditions, they do not work well in a variety of difficult circumstances. For example, the volume of liquid to be pumped may be large or contain dirt and/or debris. If the pump intake becomes clogged, it can fail to pump the water. Sometimes, the motor in the pump continues to operate even though it is not pumping the water. The motor may then fail and the pump becomes inoperable. In the case of battery-operated pumps, the battery may be drained, which in turn may negatively impact its ability to fully recharge or the length of time it can operate without needing to be recharged.

Conventional pumps are also limited in their operation. There may be a need to pump the liquid a long distance or a significant height. The location may be dark or confined. It would be an advantage if the pump could be lighted and self-supporting in an upright position without the need for a person to have to attend to the pump during the entire time the liquid is being pumped.

BRIEF SUMMARY

The preferred embodiments of the pump have an improved mounting for the motor device which facilitates the relatively quick and easy removal of the motor from the pump. The pump has a main body, said main body being hollow and cylindrical, a motor housing, said motor housing being connected to said main body by threads at a first end and having a removable end cap on a second end, and an electric motor located in said motor housing. An electronics housing has a battery adapter plate, a switch, and a discharge port, said housing enclosing wires and electronics such that said motor pumps liquid from the end cap, through the motor housing and the main body, and out of the discharge port when said switch is turned on.

DETAILED DESCRIPTION OF THE PREFERRED EMBODIMENTS

A preferred embodiment of a pump 100 according to the invention has the exterior configuration shown in FIGS. 1-7. Referring to the disassembled view in FIG. 9, pump 100 has a main body 14 which is hollow and generally cylindrical in shape. The main body 14 is preferably composed of anodized aluminum, but may alternatively be composed of other high-strength materials.

Figure 1:
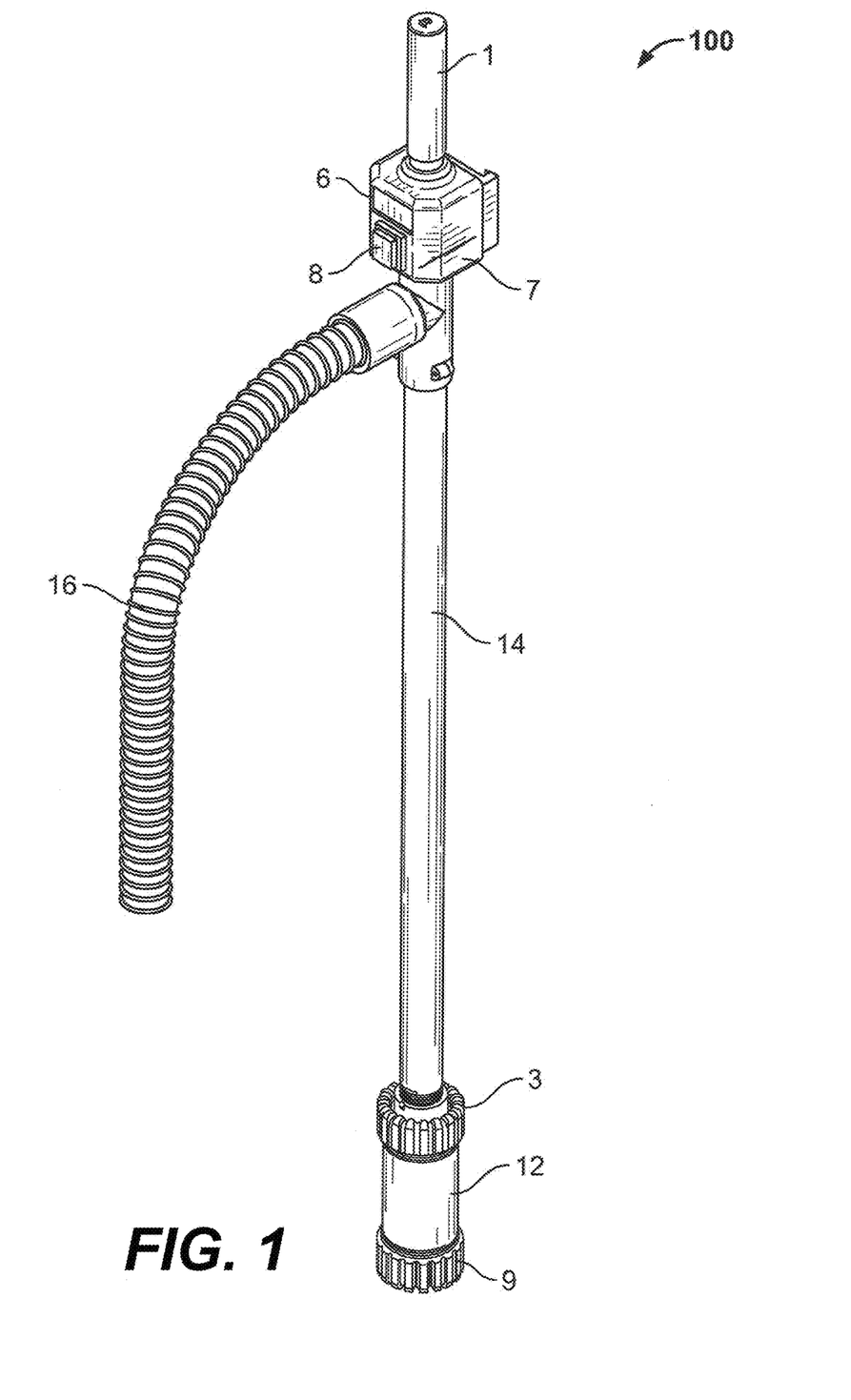
FIG. 1 is a perspective view of a pump according to a preferred embodiment of the invention.
Figure 2:
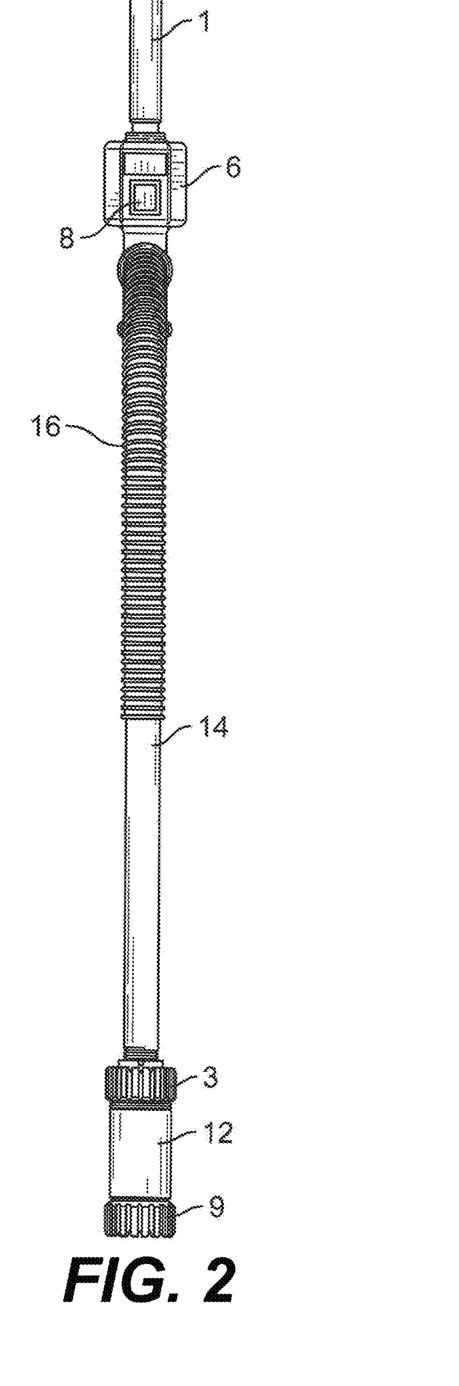
FIG. 2 is the back view of the pump in FIG. 1.
Figure 3:
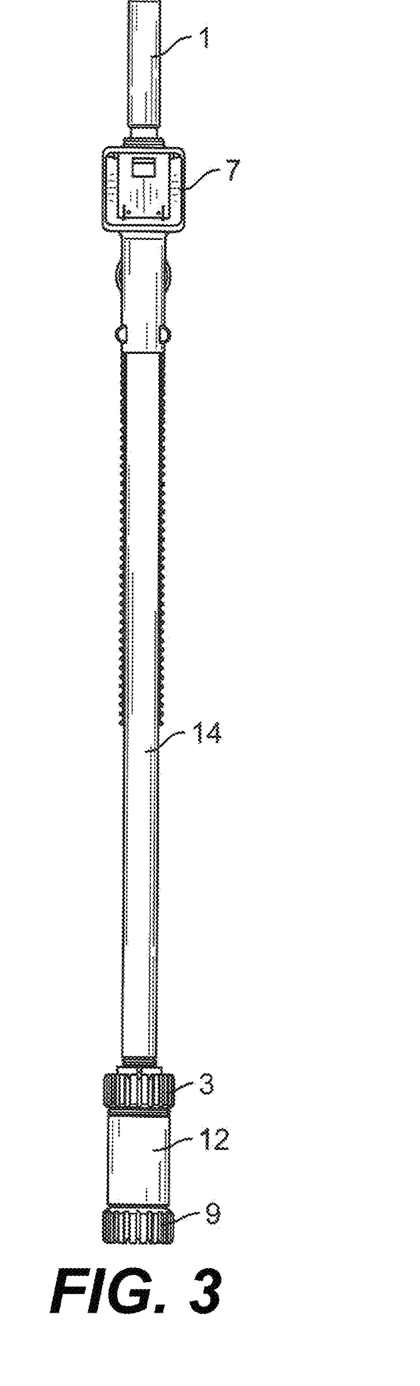
FIG. 3 is the front view of the pump in FIG. 1.
Figure 4:
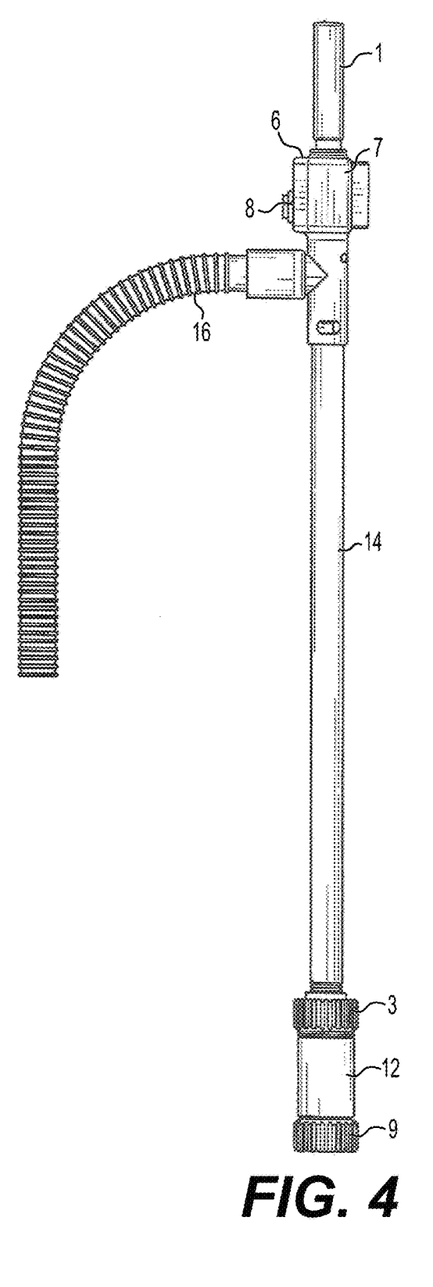
FIGS. 4 and 5 are left and right side views, respectively, of the pump in FIG. 1.
Figure 5:
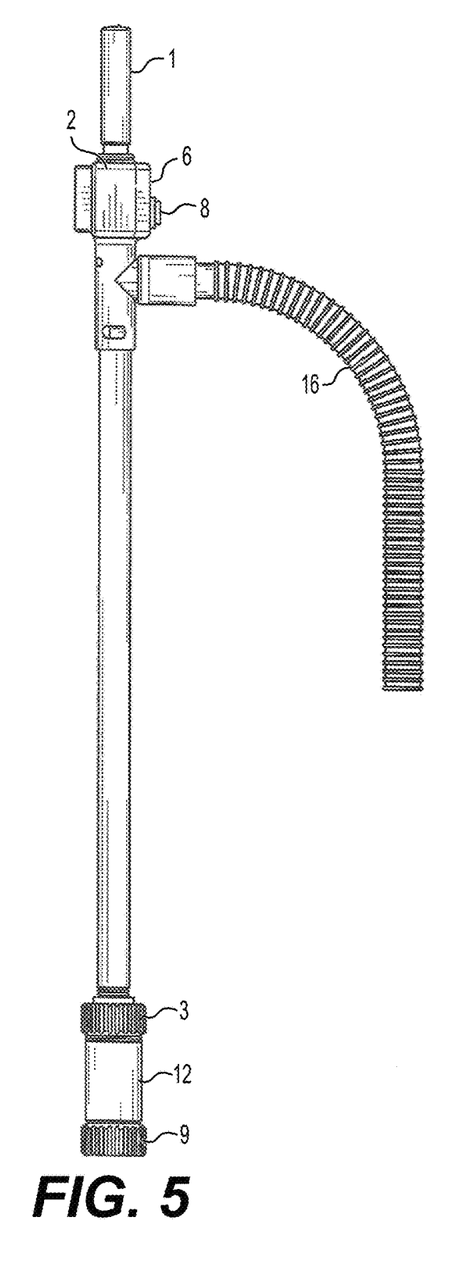
Figure 6:
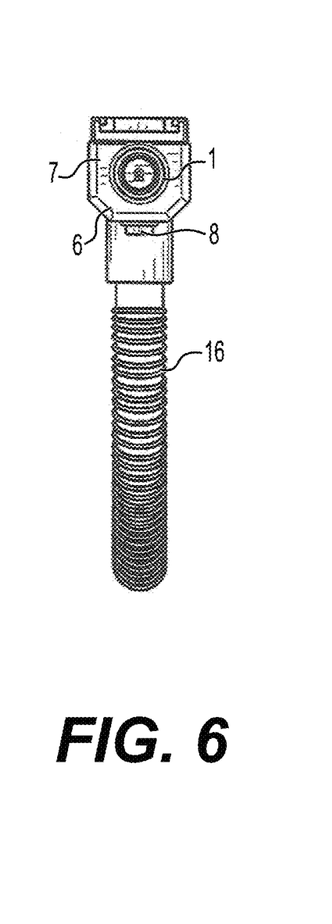
FIGS. 6 and 7 are top and bottom views, respectively, of the pump in FIG. 1.
Figure 7:
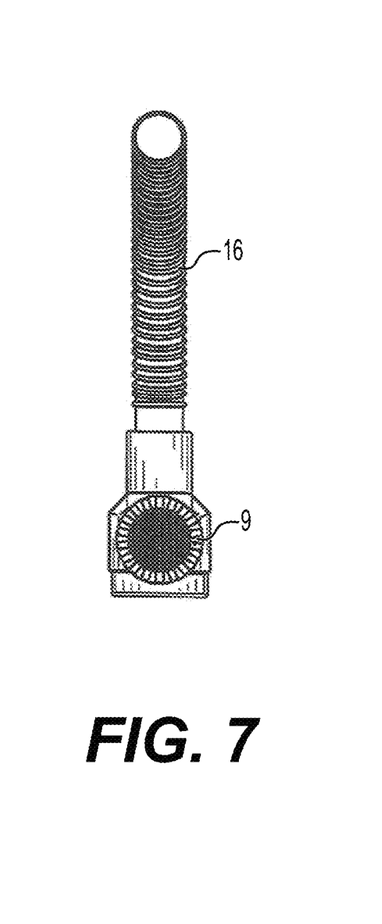
Figure 8:
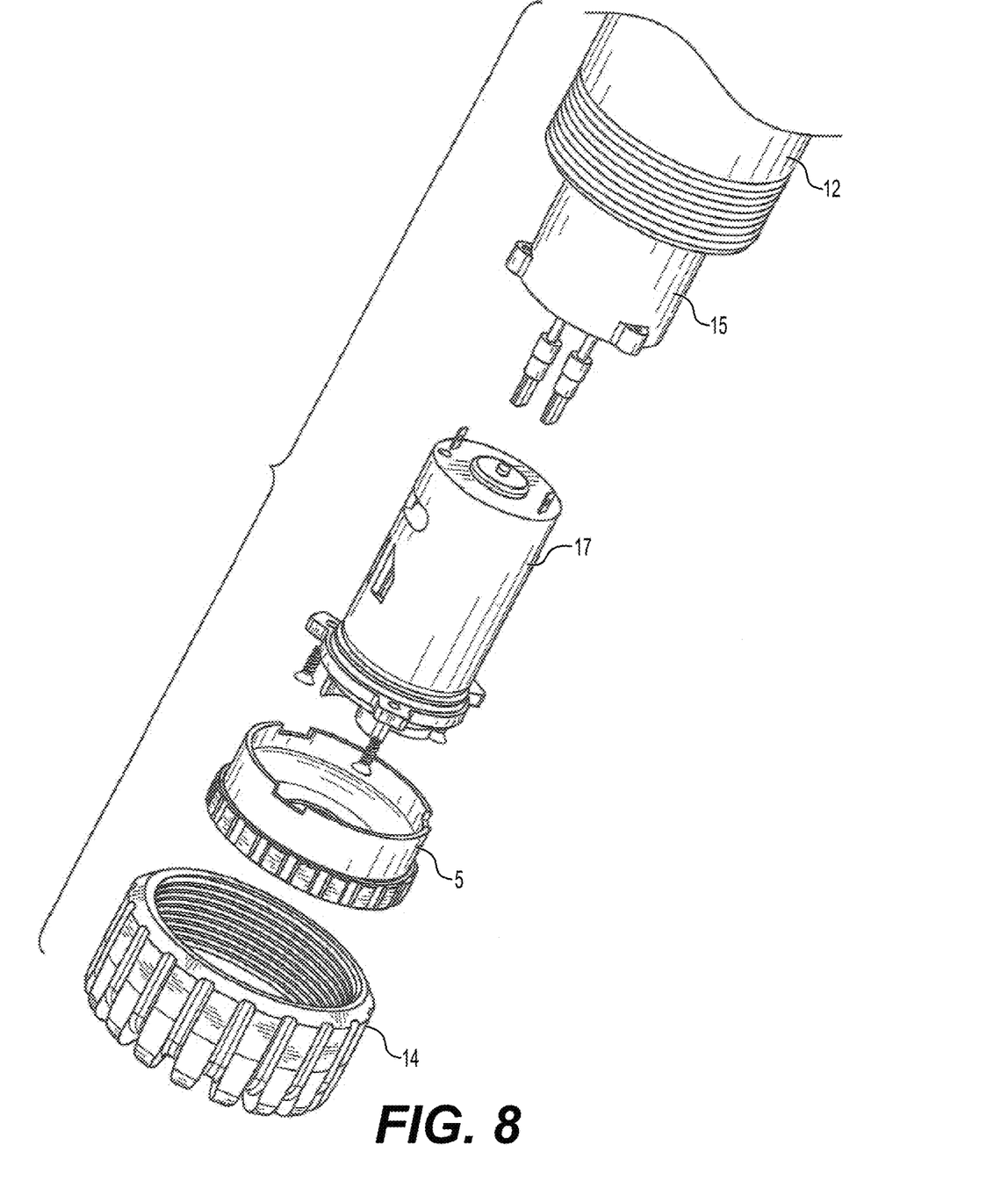
FIG. 8 is a close-up view of the preferred motor housing of the pump in FIG. 1 when disconnected.
Figure 9:
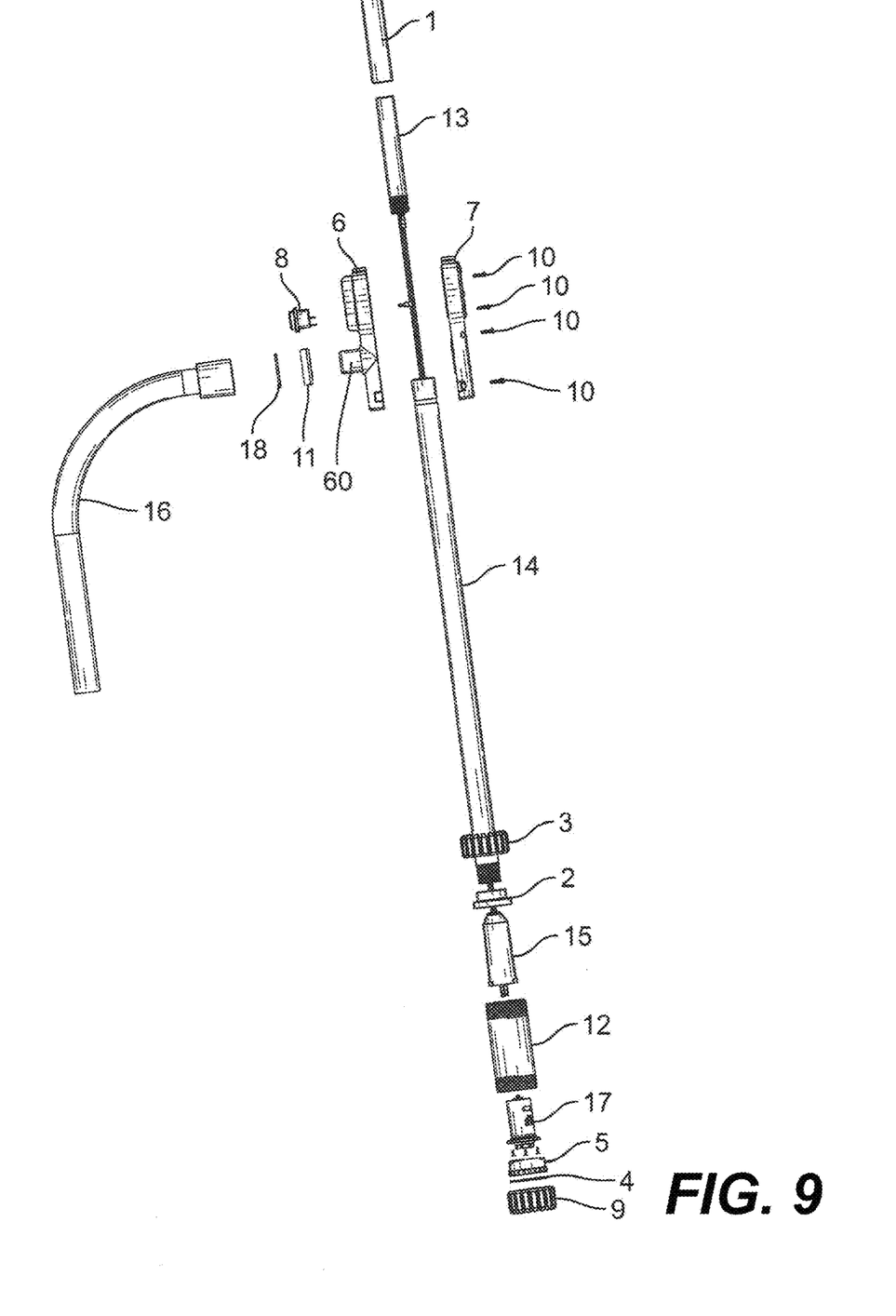
FIG. 9 is a disassembled view of the pump in FIG. 1.

At the top end of main body 14 is an electronics housing, preferably formed from a rugged, impact resistant, polycarbonate material. The electronics housing preferably has a front part 6 that includes a water-resistant, sealed power switch 8 and has a discharge port extending approximately 2 to 4 inches from the surface of the housing. The outer circumference of the discharge port matches the inner circumference of discharge hose 16. On the flange of the discharge port is a washer mount 11 and a coupling washer 18 which couples with the magnets in the connector of discharge hose 16 as described in further detail below. Rear part 7 of the electronics housing may have either a battery attachment or a battery adapter plate. The battery attachment receives, secures in place, and electrically connects a battery of a specific configuration to switch 8 and the electric motor. The battery adapter plate allows batteries of different configurations to be secured and connected through the use of configured adapters respectively corresponding to the different configuration batteries.

Front part 6 and rear part 7 are secured to each other and to main body 14 by a plurality of screws 10 or other equivalent attachment mechanism. When attached, the top of front part 6 and rear part 7 have a hole with interior threads that engage with the exterior threads of a cylindrical handle 13. Cylindrical handle 13 is preferably of the same material as main body 14, and is covered with a grip 1, which may be made of rubber other suitable material. The distance from the bottom of the pump to the discharge port is preferably about 38 inches high. The handle 13 is preferably about six inches long so that the entire height of the pump is about 48 inches. There may be multiple handles 13 of different lengths, each of which can be alternatively connected and disconnected to the electronics housing so as to change the effective height of the pump. These alternative length handles preferably still have the grip 1 of approximately six inches on the end and are useful for use with deep sump pumps and pits. The handle may be, for example, 24 inches long so as to provide an overall height of approximately 66 inches.

The electronics housing contains within it the wires and electronics so that the motor is turned on and off by the switch 8. The wires extending through main body 14 to the motor are preferably color coded to ensure proper connection to the pump motor.

Figure 14A:
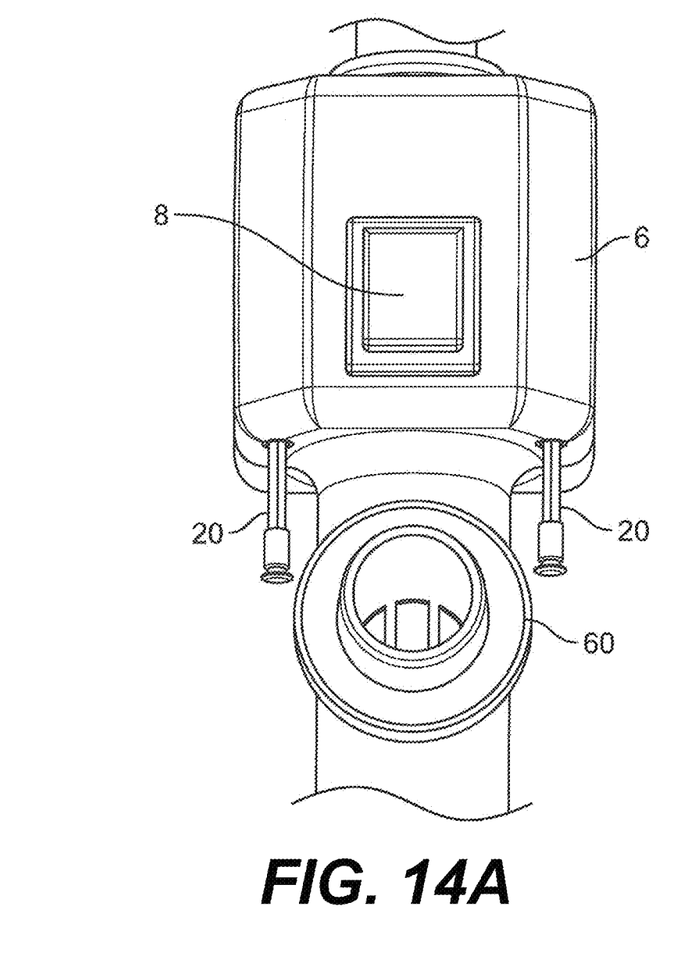
FIGS. 14A and 14B illustrate an alternative electronics housing having LED lights for the pump shown in FIG. 1.
Figure 14B:
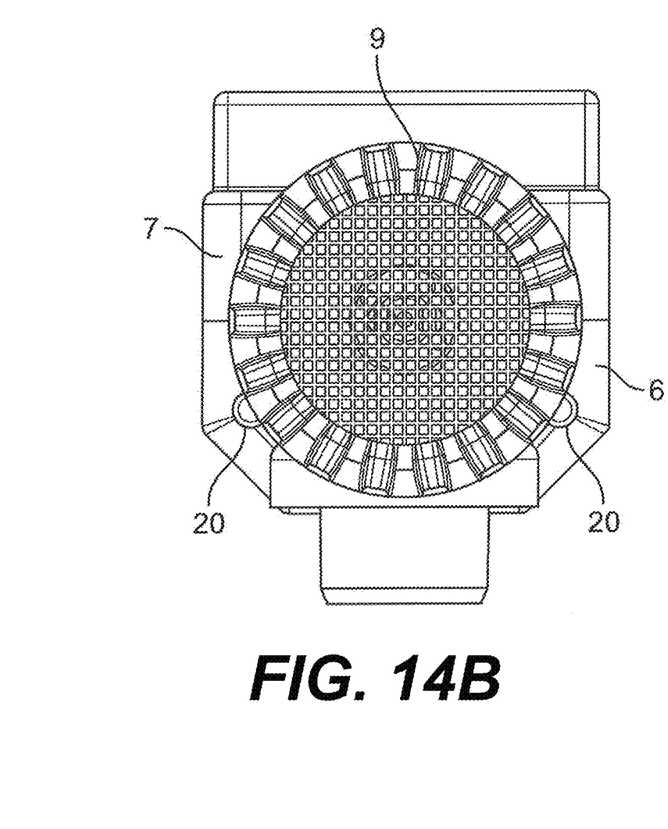

The bottoms of front part 6 and/or rear part 7 may have one or more LED lights 20 that are directed downwards and turned on automatically whenever switch 8 is turned on. There can be two LED lights as shown in FIG. 14A or there can be a different number of lights. The LED lights are shown outside of the electronics housing in the partially assembled view of FIG. 14A for the purpose of illustration and understanding. It is to be understood that when fully assembled, the LED lights are recessed into holes formed in the electronic housing so that no part thereof extends beyond the outer periphery of the electronics housing. Preferably, the holes are tapped and the LED lights are threaded into the holes, but any suitable arrangement may be employed The LED lights preferably illuminate the area near the bottom of the pump to assist in dark conditions. Although only two LED lights are shown in FIGS. 14A and 14B, there may be any number of lights and they may be located at various locations. However, none of the LED lights should not be located directly above the discharge port to hose 16 as shown in the example of FIGS. 14A and 14B. Optical elements may be part of the LED lights themselves or they may be located in the holes along with the LED lights in order to provide a desired field of illumination. There may be LED lights of different fields of illumination so that an operator may choose to have a narrow field or a wider field around the pump. The LED lights of different fields are preferably selectable by the user using a switch or other device located on the electronics housing.

There are exterior threads on approximately the last two inches of the bottom end of main body 14. The top end of a motor housing 12 has similar threads and is connected to the bottom end of main body 14 by a union 2 and plastic cap 3. It is preferable that the motor housing 12 can be disconnected from main body 14 by hand so as to allow easy access to the motor within. For this reason, plastic cap 3 is ridged as shown in the figures or the surface is otherwise formed so as to permit easy turning.

Motor housing 12 preferably has a larger diameter than main body 14 so as to accommodate a motor 17 that can pump liquid at a high rate and/or to a relatively high height. Motor 17 is not mounted directly to the inside wall of motor housing 12. A key feature of the preferred embodiments is that motor unit 17 is assembled so that it can be accessed and replaced if necessary by a person once motor housing 12 is disconnected from the main body. The preferred embodiments use a wire harness assembly 15 having a first open end into which motor unit 17 can be inserted and then securely fixed into place. The wires from the electronic housing pass through the second end of wire harness assembly 15 opposite the first end and are preferably terminated by terminals which can be connected to the terminals of the motor unit 17. The terminals of motor unit 17 are preferably marked or color coded to match the marked or color coded wires. The motor unit 17 has one or more seals such that, when motor unit 17 is fixed in place inside wire harness assembly 15, the bottom of motor unit 17 can be secured to wire harness assembly 15 to form a water tight fit. Preferably, motor unit 17 is secured to wire harness assembly 15 by a plurality of screws through a respective plurality of flanges.

Figure 10A:
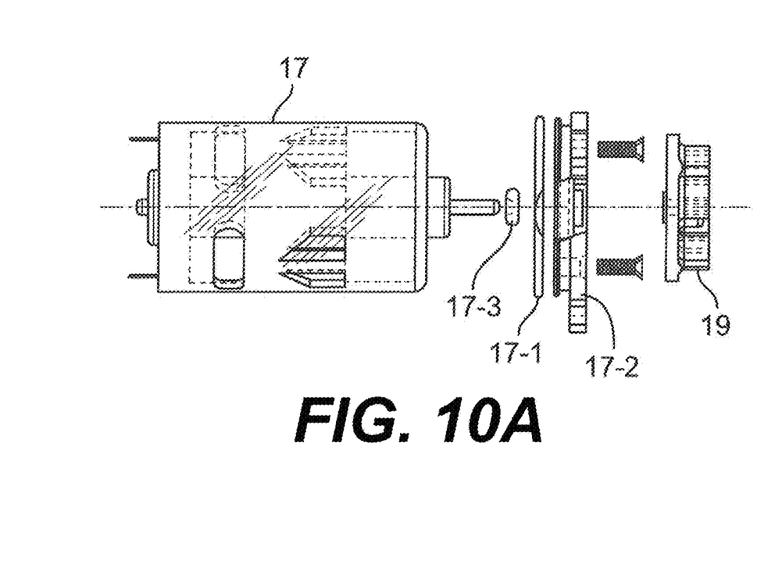
FIGS. 10A, 10B and 10C are side view, end view, and perspective view, respectively, of a preferred embodiment of the motor assembly in the pump shown in FIG. 1.
Figure 10B:
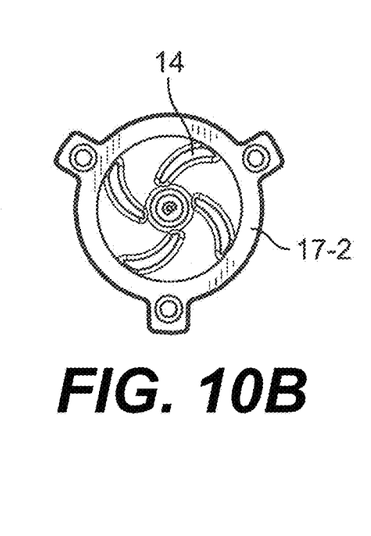
Figure 10C:
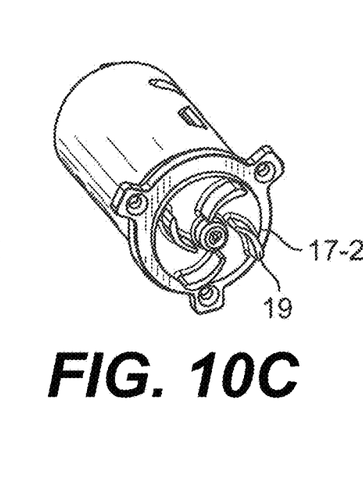

FIG. 10C shows a perspective view of a preferred embodiment of motor unit 17 having a cylindrical motor mount 17-2 surrounding impeller 19. As best seen in FIG. 10B, the shaft of motor 17 is not perfectly round and instead has a flat so that impeller 19 can be aligned and pressed onto the motor shaft. As shown in FIG. 10A, screws attach motor mount 17-2 to motor 17 with a large diameter O-ring 17-1 squeezed inbetween. A smaller diameter O-ring 17-3 surrounds the shaft of motor 17.

Figure 13:
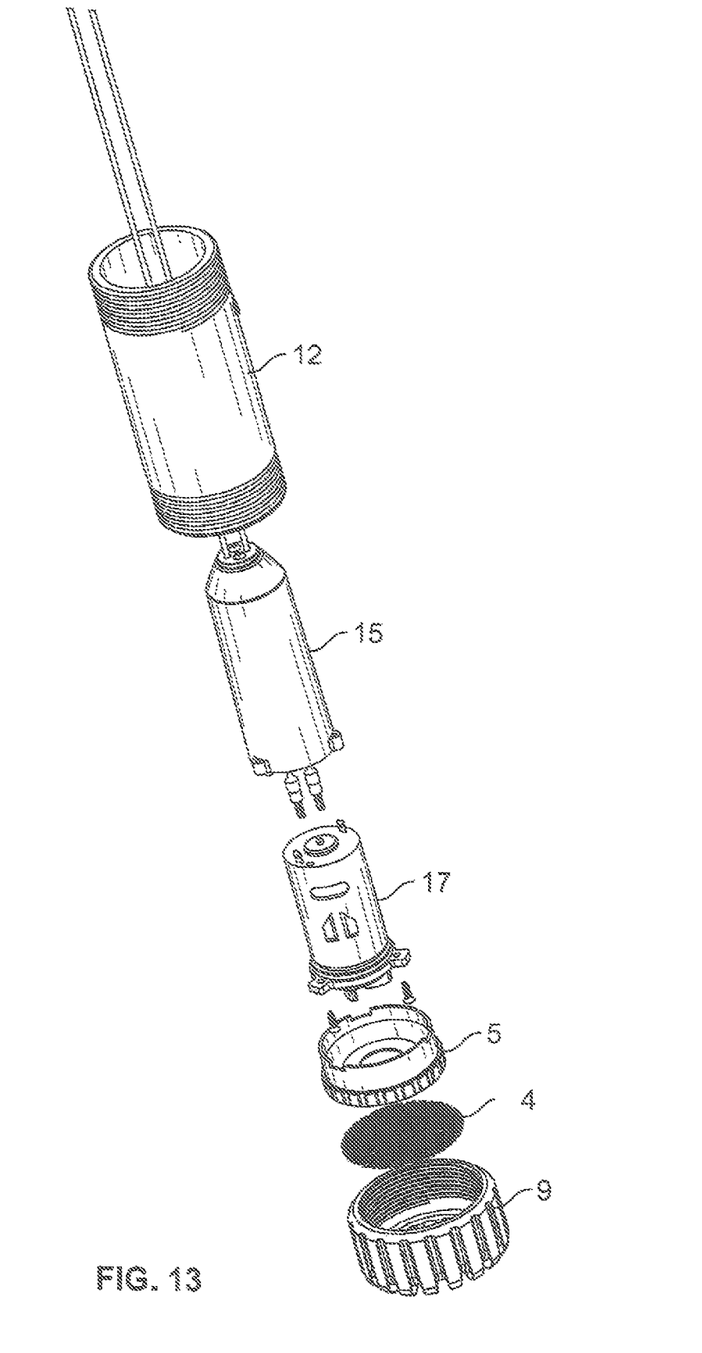
FIG. 13 is an exploded view of the screen or filter 4 and other elements inside the preferred motor housing of FIG. 9.

A round spacer 5 preferably has a plurality of slots that are sized and located to engage with corresponding flanges on motor unit 17. A screen or filter 4 fits on the side of spacer 5 opposite from the motor unit 17. The bottom end of motor housing 12 has external threads similar to those on its top end. End cap 9 is screwed onto the bottom end of motor housing 12 holding screen or filter 4 and the other elements within motor housing 12 firmly in place.

With this configuration, screen or filter 4 can be easily replaced or changed simply by unscrewing end cap 9. Motor unit 17 can also be replaced or changed by unscrewing the end cap and reversing the steps described above to assemble the motor unit 17 into a watertight fitting inside motor housing 12.

The pump operates when switch 8 is turned on. When configured as shown and described herein, motor 17 operates to force the transfer of liquid drawn from the bottom of the pump through end cap 9 and screen or filter 4, through motor housing 12 and main body 14, and out the discharge port 60 formed as part of the electronics housing. The discharge port 60 is preferably an integral part of the front part 6 of the electronics housing. As explained below, a preferred embodiment uses the same or substantially similar connector for discharge port 60 and each flexible discharge hose 16 shown in FIG. 11. Discharge port 60 has a base part 61 with a circular end face 61-2 formed therein. End face 61-2 may be substantially flush with base part 61 or, as shown, the base part 61 may have a lip 61-1 surrounding the outer circumference of end face 61-2. The pumped liquid passes through a hollow coupling 61-3 on the inside of circular end face 61-2. The outer circumference of hollow coupling 61-3 matches the inner circumference of the connector of discharge hose 16 and the outer circumference of end face 61-2 matches the outer circumference of the connector of discharge hose 16. A magnetic washer 62 is glued onto circular end face 61-2, such as by using Loctite 416 adhesive.

Figure 12:
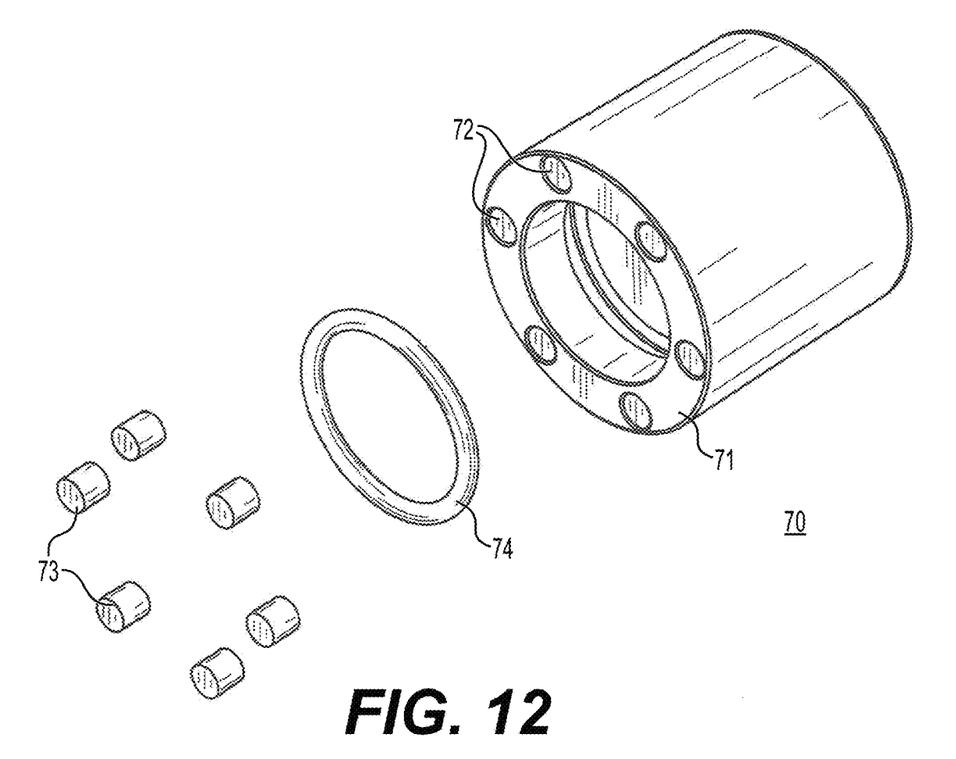
FIG. 12 is a disassembled view of the preferred connector for discharge hose 16 of the pump shown in FIG. 1.

The end face 61-2 matches the dimensions of the circular end face 71 of the matching connector 70 of a discharge hose 16 as illustrated by FIG. 12. The discharge hose matching connector 70 is preferably formed of a rigid polycarbonate material. The circular end face 71 has a plurality of similarly shaped and dimensioned holes 72, into which a plurality of correspondingly shaped cylindrical magnets 73 are glued. The holes 72 are preferably round and the magnets are preferably cylindrical in shape. The magnets 73 and magnetic washer 62 provide a strong and secure connection when the parts are brought into close proximity with each other, while the connection be broken by mere manual effort and no tools. The number and strength of magnets can be varied although it is preferred that the magnets be equally spaced about the end face 71 of the discharge hose connector 70.

Figure 11:
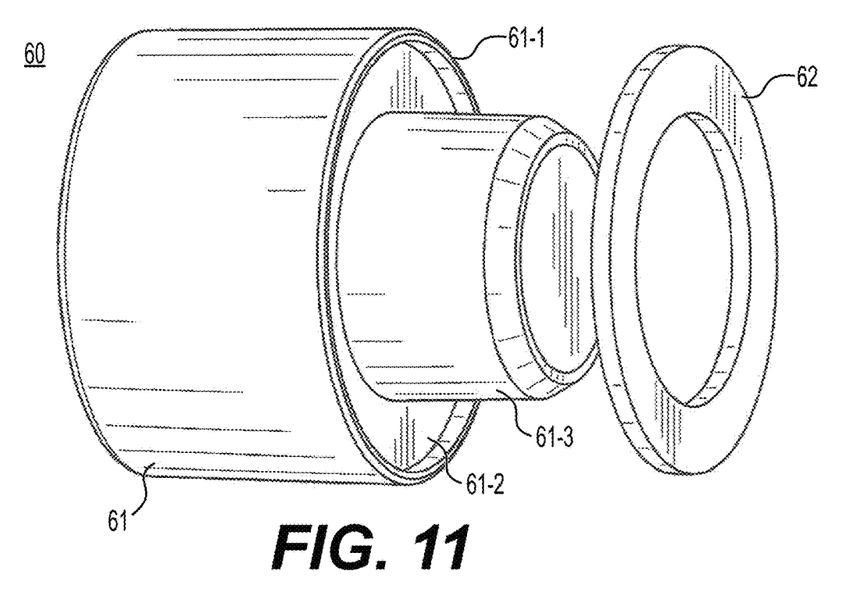
FIG. 11 is a view of a hose coupling used to couple two hoses together in a preferred embodiment of the invention.

While the connector of the discharge hose is rigid, there is an O-ring 74 provided on the end of the connector opposite the discharge port so that the majority of the discharge hose can be flexible and yet securely connected to the connector without leakage. The other end of discharge hose 16 preferably has a coupling as shown in FIG. 11. This allows a plurality of hoses to be daisy-chained together in serial fashion so that discharge hose can be lengthened. The hoses preferably have different lengths, such as 2 feet, four feet, seven feet, etc., so as to afford greater flexibility in the overall length of the discharge hose. Such flexibility adds to the adaptability of the pump to work well in different conditions. It is frequently desired that the pump is turned on and left unattended while liquid is being pumped. If, for example, liquid is to be pumped over a wall, through a window, etc. a suitable plurality of hoses can preferably be daisy-chained so that they will not move during unattended operation, perhaps undesireably pumping the liquid right back into the confined environment from which it is desired to be pumped in the first place.

Although the switch 8 and electronics housing are preferably water-resistant, they should ordinarily not be permitted to be immersed in the liquid to be pumped. Moreover, in operation, the pump should be kept substantially upright in order to maximize the flow rate of liquid through the bottom end cap 14 and to reliably transfer the liquid until it is almost entirely pumped. However, it is frequently desired to let the pump run attended and sometimes difficult to reliably position the pump so that it can be left unattended without falling into the liquid.

Any number of tools may be used to keep the pump upright. However, it is preferable that there be a stand of some sort that is relatively inexpensive to manufacture, easy to transport and use with the pump, and reliable. The flow of liquid through the pump may not be absolutely constant and the pump may shake or jerk due to interruptions in the transfer caused by debris in the liquid or even differences in the viscosity of the liquid.

In realizing these goals, the inventors have made the important determination that the stand need not, and preferably does not, place the pump in a perfectly upright position. When in a perfectly upright position, the pump may lean in any direction and thus any stand would have to provide support in any direction. A stand for the pump would preferably position the stand at a slight angle from the vertical. It would provide support in the direction in which the pump would lean. And the stand would preferably be located on the side of the pump on which the battery is located since that would be the heavier side of the pump.

Figure 15A:
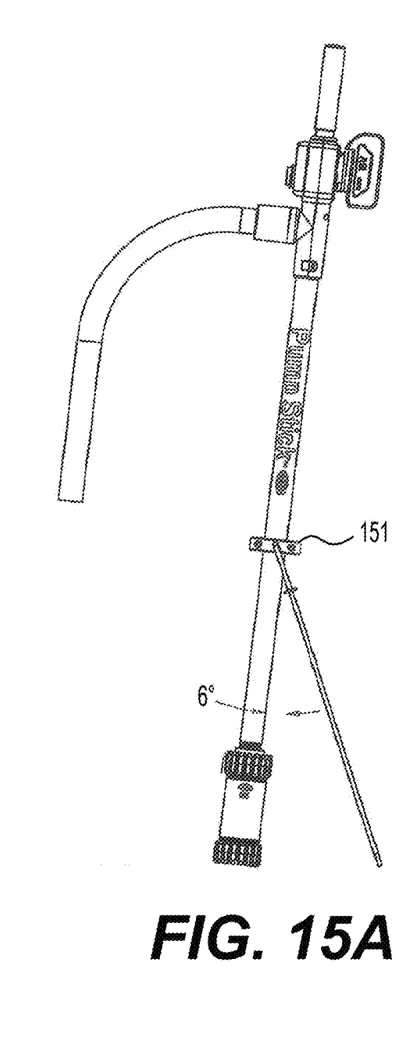
FIGS. 15A and 15B illustrate a first preferred embodiment of an optional stand for the pump shown in FIG. 1.
Figure 15B:
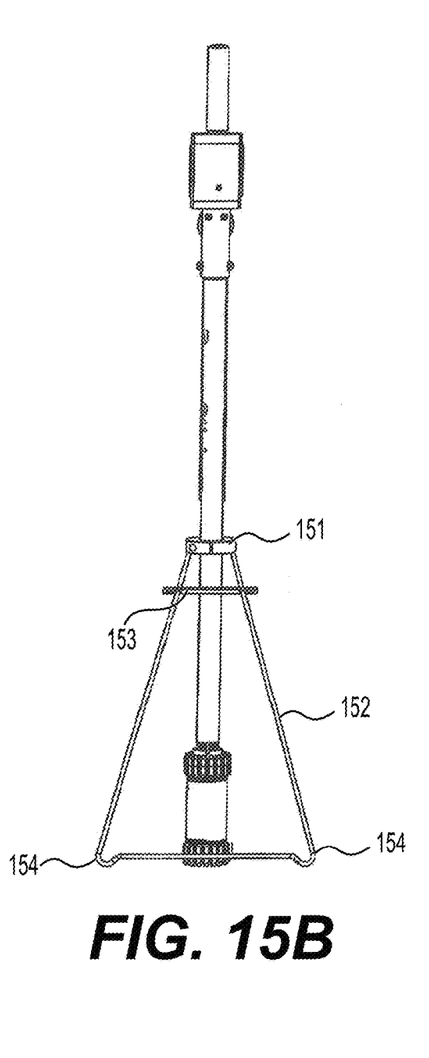

One preferred embodiment of such a stand is stand 150 shown in FIGS. 15A and 15B. It consists of a circular ring 151 that fits snugly around the main body 14. A triangular supporting structure 152 is connected to the ring with a brace 153 and multiple points of contact 154 with the ground or other surface on which the pump is placed. The stand preferably holds the pump at an angle of approximately six degrees from the vertical on the side of the battery. There may any manner of indentation or orientation between the main body 14 and the circular ring that causes the circular ring to be positioned so that the stand leans in the direction of the battery. The stand can be composed of aluminum or other strong material, and is preferably coated so as to be resistant to rust or other corrosion from the liquid in which it is placed.

Figure 16A:
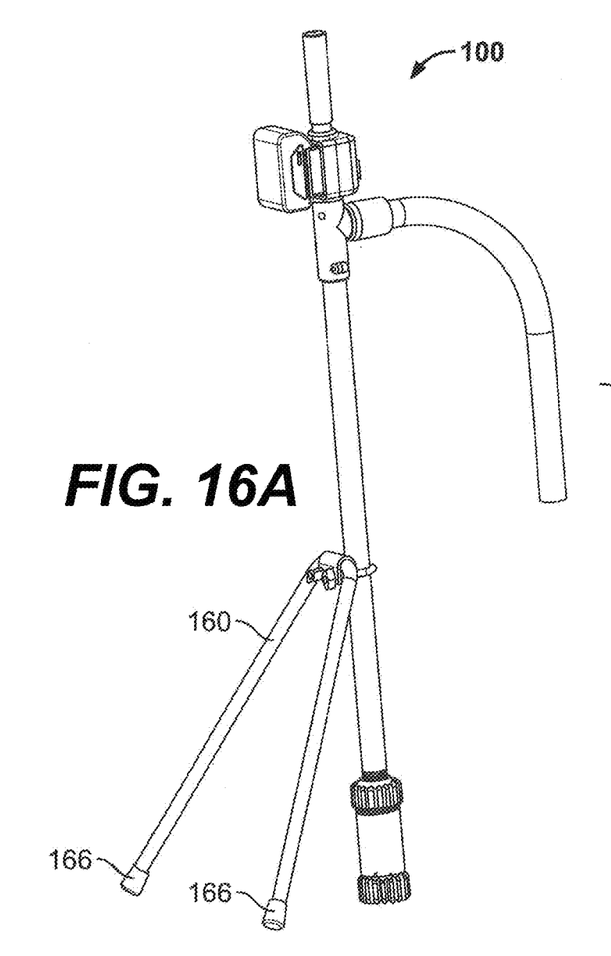
FIGS. 16A and 16E illustrate a second preferred embodiment of an optional stand for the pump shown in FIG. 1.
Figures 16B, 16C, 16D, 16E:
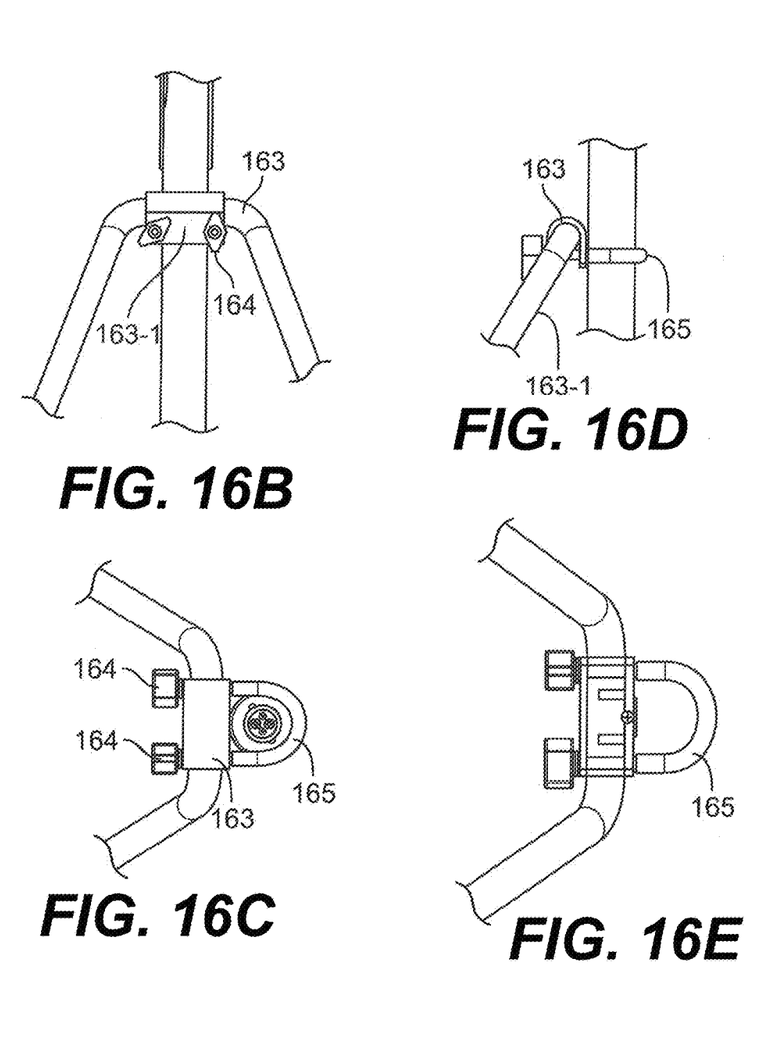

An alternative embodiment is a pump stand 160 as shown in FIGS. 16A-16E. The primary component in pump stand 160 is body 161, which may be, for example, a single piece of hollow, light-weight aluminum. The body 161 may be bent into a substantial V-shape, as shown in FIG. 16A, or a substantial U-shape (not shown), or any shape between a U-shape and a V-shape. A connection portion 162 of brace 161 may be treated to provide a friction surface. A brace 163 fits around most of the circumference of the connection portion 162 and has an extension component 163-1 which extends lightly below body 161 as shown in FIGS. 16B and 16D. A bracket 165 fits around main body 14 of the pump and passes through two holes in extension component 163-1. At least a portion of bracket 165 may be treated with rubber or other surface to prevent marring or scratching main body 14. When fasteners 164 are tightened while manually manipulating the angle between stand 160 and main body 14, the stand 160 is put into a position where it can contain the pump substantially upright as shown in FIG. 16A. Fasteners 164 are preferably formed nuts that enable tightening by hand. There may also be end covers 166, which may be made of rubber, that inhibit the stand 160 from slipping.

Figure 17A:
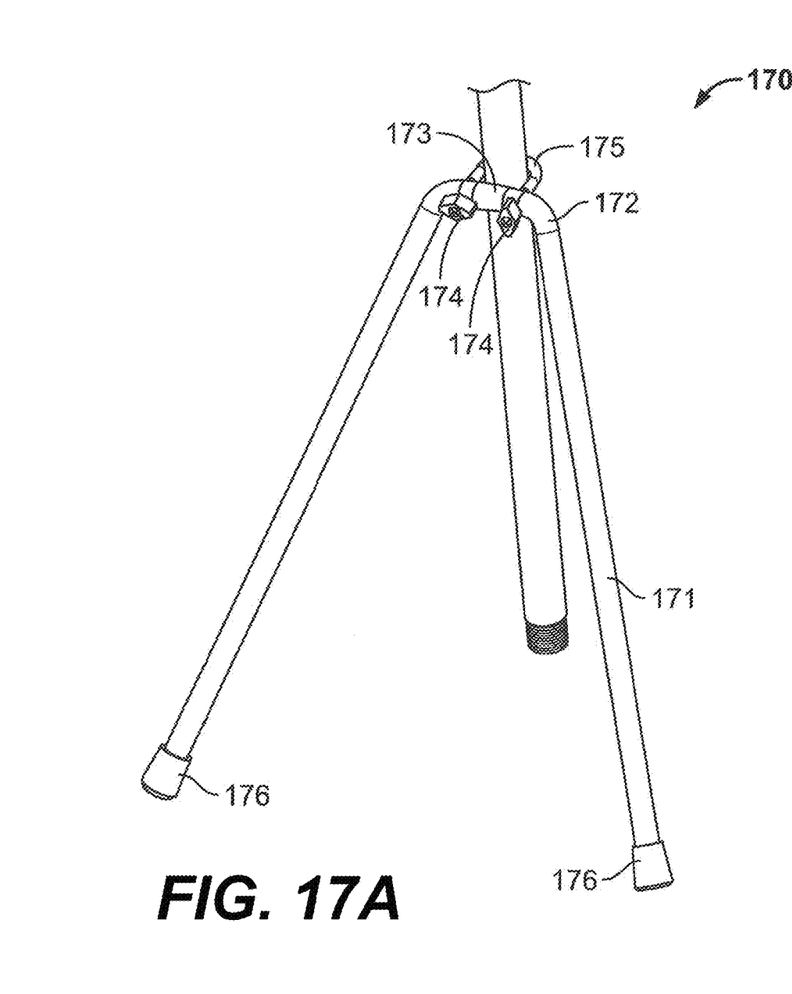
FIGS. 17A and 17D illustrate a third preferred embodiment of an optional stand for the pump shown in FIG. 1.
Figure 17B:
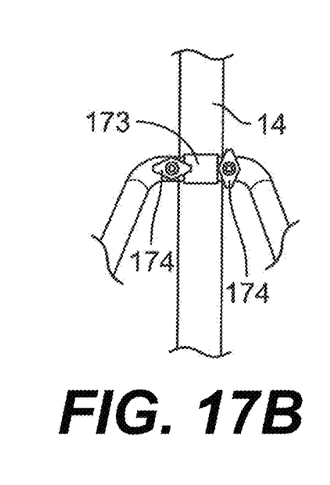
Figure 17C:
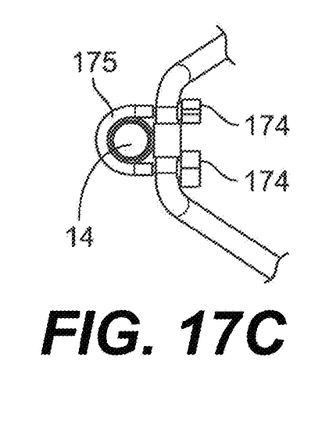
Figure 17D:
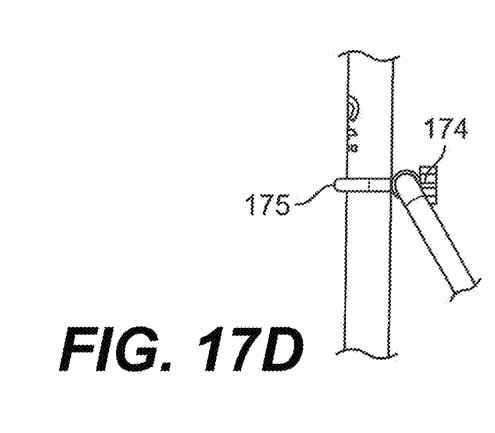

Another embodiment is pump stand 170 shown in FIGS. 17A-17D. The primary component is body 171, which may be, for example, a single piece of hollow, light-weight aluminum. The body 171 may be bent into a substantial V-shape, as shown in FIG. 17A, or a substantial U-shape (not shown), or any shape between a U-shape and a V-shape. A connection portion 172 of brace 171 may be treated to provide a friction surface. A U-shaped bracket 175 surrounds main body 14 of the pump and passes through two holes in main body 171. When fasteners 174 are tightened while manually manipulating the angle between stand 170 and main body 14, the stand 170 is put into a position where it can contain the pump substantially upright as shown in FIG. 17A. Fasteners 174 are preferably formed nuts that enable tightening by hand. A portion of bracket 175 is treated with rubber or other surface to prevent bracket 175 from marring or scratching main body 14. There may be a cover or frictional element 173 on main body 171 that prevents it from marring or scratching main body 14 while holding the pump in a substantially, but not perfectly, upright position. There may also be end covers 176, which may be made of rubber, that inhibit the stand 170 from slipping.

There may be various modifications of the alternative stand embodiments shown and described herein. Such a stand would remain especially easy to manufacture and set up.

We claim:

1. A portable pump for pumping non-flammable liquids, comprising:
    a main body, said main body being hollow and cylindrical;
    a motor housing, said motor housing being connected to said main body by threads at a first end and having a removable end cap on a second end;
    an electric motor located in said motor housing; and
    an electronics housing having a battery adapter plate, a switch, and a discharge port, said electronics housing enclosing wires and electronics such that said motor pumps liquid from the end cap, through the motor housing and the main body, and out of the discharge port when said switch is turned on,
    wherein said motor can be removed from said motor housing when said motor housing is disconnected from said main body and said end cap is removed.

2. The portable pump as recited in claim 1, wherein the motor is contained within a wire harness assembly, the wires from said electronics housing passing through a first end of said wire harness assembly and being terminated in terminals that can be connected to terminals of said electric motor by hand.

3. The portable pump as recited in claim 2, wherein the pump further comprises a spacer in the motor housing, said spacer being located between a motor mount of said electric motor and said end cap such that said electric motor is secured in place when said end cap is on.

4. The portable pump as recited in claim 3, wherein the motor mount of said electric motor comprises a plurality of flanges and said spacer comprises a plurality of slots equal in number to the plurality of flanges, and the plurality of slots of the spacer engage the plurality of flanges of the motor mount when the spacer is properly positioned.

5. The portable pump as recited in claim 3, wherein a screen or filter fits into the spacer and can be removed or replaced when the end cap is off.

6. The portable pump as recited in claim 1, wherein the discharge port comprises a magnetic washer and the connector of a discharge hose connected to the discharge port has a plurality of magnets that secures the discharge hose to the discharge port.

7. The portable pump as recited in claim 6, wherein a plurality of discharge hoses, each with a plurality of magnets in its connector, can be connected in daisy chain fashion.

8. The portable pump as recited in claim 1, wherein the electronics housing further comprises a plurality of lighting elements, said plurality of lighting elements illuminating the area around the bottom of the pump.

9. The portable pump as recited in claim 1, further comprising a stand adapted to engage with said main body and to maintain said pump in a position at a slight angle from vertical.

10. The portable pump as recited in claim 1, wherein said main body comprises a metal main body and the electronics housing is formed from an impact resistant, polycarbonate material.

* * * * *